(12) United States Patent
Gallmeyer et al.

(10) Patent No.: US 6,285,115 B1
(45) Date of Patent: Sep. 4, 2001

(54) METHOD AND APPARATUS FOR CONTROLLING POSITION AND VELOCITY OF A PIEZOELECTRIC DEVICE

(75) Inventors: Christopher F. Gallmeyer; Larry G. Waterfield, both of Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/576,401

(22) Filed: May 22, 2000

(51) Int. Cl.[7] ............................. H01L 41/06; H01L 41/04
(52) U.S. Cl. .................................................. 310/317
(58) Field of Search ..................................... 310/316, 317

(56) References Cited

U.S. PATENT DOCUMENTS

| | | |
|---|---|---|
| 5,568,003 | 10/1996 | Deck . |
| 5,714,831 | * 2/1998 | Walker .................................. 310/316 |
| 5,796,213 | 8/1998 | Kawasaki . |
| 5,821,666 | 10/1998 | Matsumoto et al. . |
| 5,834,876 | 11/1998 | Luthier et al. . |
| 5,841,215 | 11/1998 | Takeishi . |
| 5,886,483 | 3/1999 | Nogarede et al. . |
| 5,889,350 | 3/1999 | Yamamoto . |
| 5,895,998 | 4/1999 | Saylor . |
| 5,907,212 | 5/1999 | Okada . |

* cited by examiner

Primary Examiner—Nicholas Ponomarenko
Assistant Examiner—Karen Addison
(74) Attorney, Agent, or Firm—Wood, Herron & Evans, LLP

(57) ABSTRACT

A control system for controlling position and velocity of a piezoelectric device. The control system includes a position control circuit that is operable to receive a control signal corresponding to a desired position of the piezoelectric device, and to compare the control signal to an estimated position of the piezoelectric device. The position control circuit generates a position error control signal that is adapted to drive the piezoelectric device to the desired position. The control system may further include a velocity control circuit that is operable to receive the position error control signal and generate a control signal that is adapted to drive the piezoelectric device to the desired position and at the desired velocity according to a predetermined velocity profile.

12 Claims, 2 Drawing Sheets

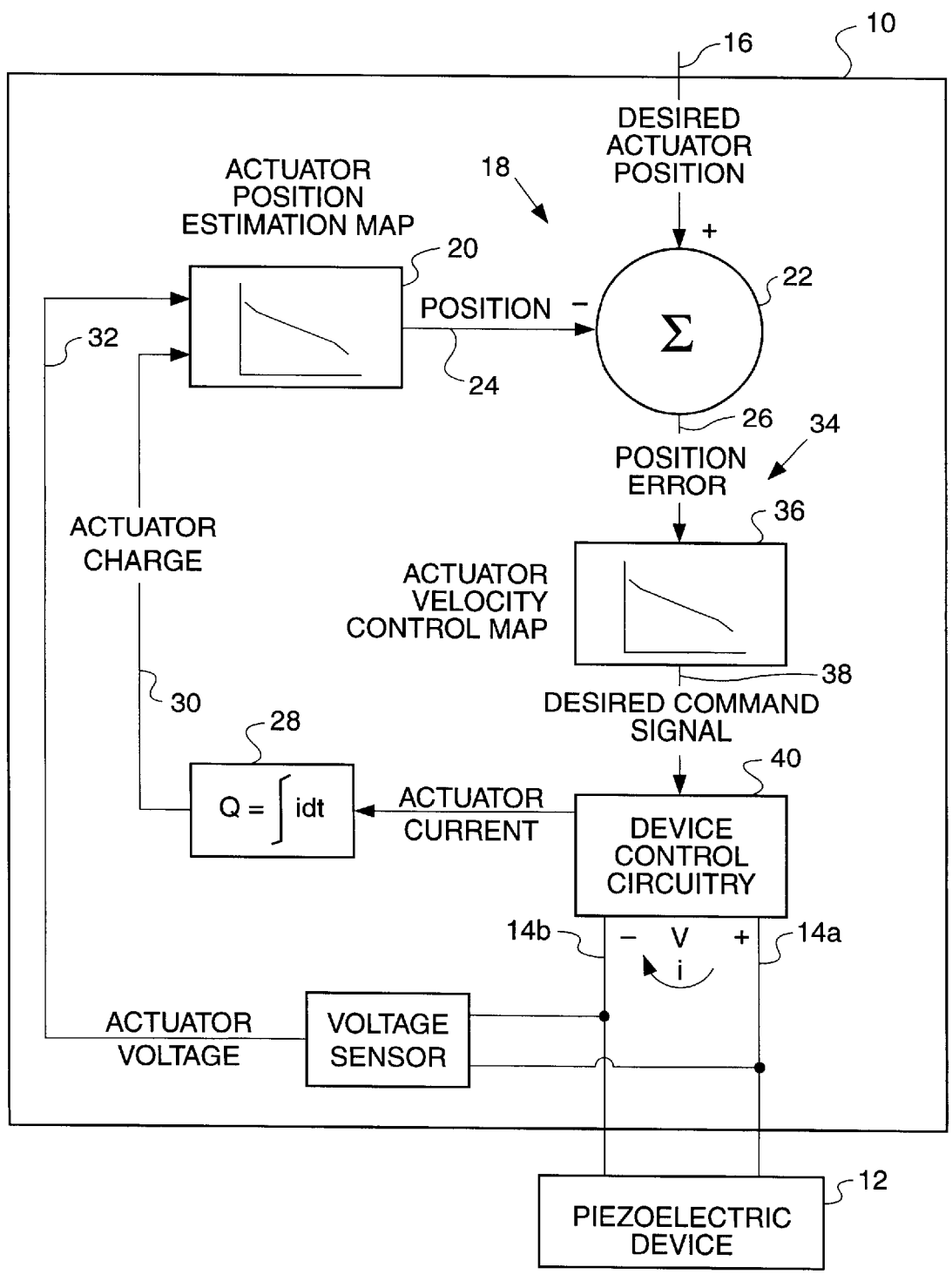

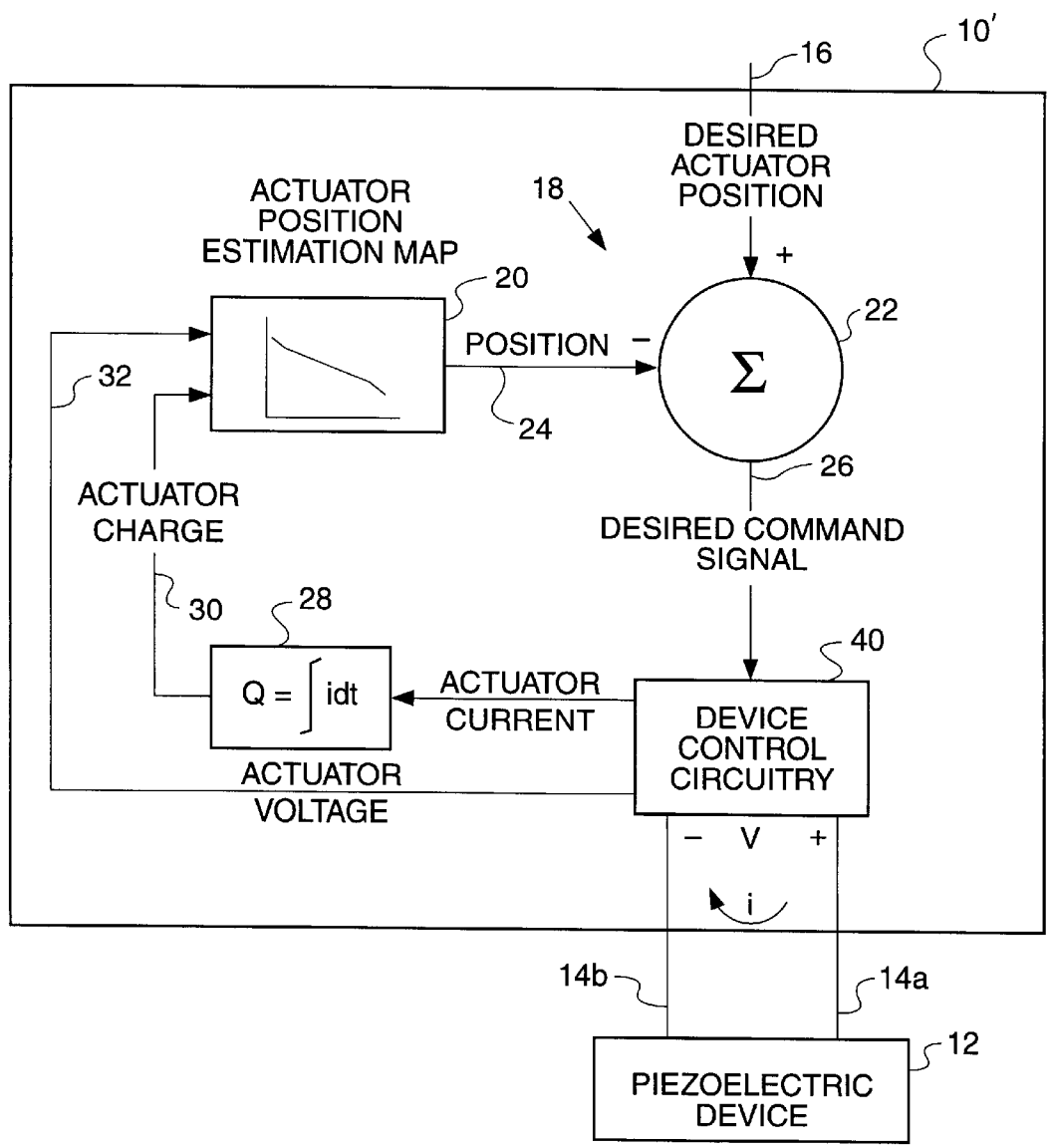

METHOD AND APPARATUS FOR CONTROLLING POSITION AND VELOCITY OF A PIEZOELECTRIC DEVICE

TECHNICAL FIELD

The present invention relates generally to piezoelectric devices and, more particularly, to an apparatus and method for accurately controlling movement of a piezoelectric device.

BACKGROUND ART

Piezoelectric devices alter their shape in response to an applied electric field. An electric field applied in the direction of polarization effects an expansion of the piezoelectric material in the same direction, while a voltage applied in the opposite direction of polarization will cause a contraction of the material in that same direction. Piezoelectric bending actuators, such as thermally pre-stressed bending actuators, use the "bending" action of the actuator to convert electrical energy into mechanical energy.

While the application of a voltage command signal typically functions well to actuate the piezoelectric device, there are some nonlinearities in operation of the piezoelectric actuator that are reflected in a voltage controlled system. For example, these nonlinearities may cause the actuator to not fully move to a desired position in response to a voltage control signal. Further the control signal may cause the actuator to move or change its position in an abrupt or sluggish manner that does not match the desired actuator movement profile for a particular application.

Thus, the present invention is directed to overcoming one or more of the problems set forth above.

DISCLOSURE OF THE INVENTION

While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a control system for controlling position and velocity of a piezoelectric device includes a position control circuit that is operable to compare a first control signal corresponding to a desired position of the piezoelectric device to an estimated position of the device. The position control circuit generates a second control signal, such as a position error control signal, that is adapted to drive the piezoelectric device to the desired position.

The control system may further include a velocity control circuit that is operable to receive the position error control signal and generate a third control signal that is adapted to drive the piezoelectric device to the desired position and at a desired velocity. A piezoelectric device control circuit is operatively coupled to the position and velocity control circuits and operable to generate a fourth control signal in response to the third control signal that is adapted to drive the piezoelectric device to the desired position and at the desired velocity so that the piezoelectric device reaches the desired position and moves to that position in accordance with a desired velocity profile.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 1 is a block diagram of a control system for controlling position and velocity of a piezoelectric device in accordance with the principles of the present invention; and FIG. 2 is an alternative embodiment of the control system shown in FIG. 1.

BEST MODE FOR CARRYING OUT THE INVENTION

With reference to the figures, and to FIG. 1 in particular, a control system 10 is shown in accordance with the principles of the present invention for controlling position and velocity of a piezoelectric device 12, such as a thermally pre-stressed bending actuator, that is coupled to the control system 10 through a pair of leads 14a, 14b. As will be described in detail below, control system 10 is operable to receive a control signal on line 16 from a control signal source (not shown) that corresponds to a desired position of the actuator 12. In response to the control signal on line 16, the control system 10 applies a voltage related control signal to the actuator 12 that is adapted to drive the piezoelectric device 12 to the desired position and at a desired velocity. In this way, the control system 10 accurately controls movement of actuator 12 in response to receipt of the control signal on line 16 from the control signal source (not shown). While not shown, it will be appreciated that the control signal source may be any position control system that can control the position of a piezoelectric device through a control signal.

Further referring to FIG. 1, control system 10 includes a position control circuit, indicated generally at 18, that is operable to estimate the position of the actuator 12, and to compare the estimated actuator position with the control signal on line 16 corresponding to the desired position of actuator 12. To this end, position control circuit 18 includes a position estimating circuit 20, typically including a two-dimensional empirical map or data structure, that provides the estimated position of the actuator 12 as an input on line 24 to a comparator circuit 22. The other input to the comparator circuit 22 is the control signal on line 16 corresponding to the desired position of actuator 12. The comparator circuit 22 is operable to compare the control signal on line 16 with the estimated position of actuator 12 on line 24, and to generate a position error control signal at its output on line 26 that is operable to drive the actuator 12 to the desired position as described in detail below.

Empirical map or data structure 20 is operable to correlate the applied voltage to actuator 12 with the charge existing on the actuator to generate an estimated position of the actuator 12 based on its known hysteresis curves. More particularly, the position control circuit 18 typically includes a current integrator circuit 28 that is operable to integrate the current flowing through actuator 12 and thereby provide the charge existing on the actuator on line 30 to the map 20. While current integrator circuit 28 is shown and described, other current sensing circuits that are operable to detect or measure current flowing through actuator 12 and to determine the charge existing on the actuator are contemplated. The applied voltage to actuator 12 is simultaneously provided to map 20 on line 32. The applied voltage to actuator 12 may be determined by a voltage sensor (not shown) or equivalent voltage sensing circuit associated with the control circuit 10 that is operable to measure or detect the voltage applied to the actuator 12. In this way, the estimated position of the actuator 12 can be determined from the values of the voltage applied to actuator 12 on line 32, the charge existing on actuator 12 on line 30, and its known hysteresis curves.

Still referring to FIG. 1, control system 10 typically further includes a velocity control circuit 34 coupled to the comparator circuit 22. Velocity control circuit 34 is a one-dimensional empirical map or data structure 36 that is operable to receive the position error control signal on line 26 from the comparator circuit 22 and generate a control signal on line 38 that corresponds to a predetermined velocity profile of the map 36. More particularly, map 36 receives the position error control signal on line 26, and generates a control signal at its output on line 38 that is coupled to an actuator control circuit 40 of conventional design. The control signal on line 38 is operable to move the actuator 12 to the desired position and at the desired velocity as determined by the velocity profile of map 36. In response to the control signal on line 38, actuator control circuit 40 is operable to generate a control signal that is adapted to drive the actuator 12 to the desired position and at the desired velocity so that the actuator 12 reaches the desired position and moves to that position in accordance with a desired velocity profile.

Each of the data structures 20 and 36 may be a look-up table stored in RAM or ROM, a software algorithm or a hardwired circuit as will be readily appreciated by those skilled in the art that is operable to generate as an output the desired control signal having a value or parameter defined by the empirical map 20, 36 in response to the respective input control signals.

Alternatively, as shown in FIG. 2, where like numerals represent like parts, a control system 10' is shown in accordance with another aspect of the present invention for controlling position of the actuator 12. In this embodiment, the velocity control circuit 34 of FIG. 1 is not present so that the position error control signal on line 26 is coupled directly from the comparator circuit 22 to the actuator control circuit 40. Therefore, in response to the control signal on line 26, actuator control circuit 40 is operable to generate a control signal that is adapted to drive the actuator 12 to the desired position.

INDUSTRIAL APPLICABILITY

In use, it will be appreciated that control system 10 is operable to control position and velocity of a piezoelectric device 12, such as a thermally pre-stressed bending actuator, in response to a control signal received at an input to the control system 10 from a control signal source (not shown). The position control circuit 18 of control system 10 is operable to generate a position error control signal on line 26 that is operable to drive the actuator 12 to a desired position. In response to the position error control signal, the velocity control circuit 34 is operable to generate a control signal that is operable to drive the actuator 12 to the desired position and at a desired velocity. The control system 10 of the present invention provides accurate position and velocity control of the actuator 12 in response to the control signal from the control signal source (not shown).

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An apparatus for controlling position of a piezoelectric device, comprising:

a position control circuit operable to receive and compare a first control signal corresponding to a desired position of the piezoelectric device and an estimated position of the piezoelectric device and to generate a second control signal in response to the first control signal and the estimated position of the piezoelectric device;

a piezoelectric device control circuit coupled to said position control circuit and operable to receive the second control signal and generate a third control signal in response to the second control signal that is adapted to drive the piezoelectric device to the desired position;

wherein said position control circuit includes a first data structure operable to correlate an applied voltage to the piezoelectric device with a charge existing on the piezoelectric device to generate the estimated position of the piezoelectric device; and wherein said position control circuit further includes a current integrator circuit operable to integrate current flowing through the piezoelectric device to determine the charge existing on the piezoelectric device.

2. An apparatus for controlling position and velocity of a piezoelectric device, comprising:

a position control circuit operable to receive and compare a first control signal corresponding to a desired position of the piezoelectric device and an estimated position of the piezoelectric device to generate a second control signal in response to the first control signal and the estimated position of the piezoelectric device;

a velocity control circuit operable to receive the second control signal and to generate a third control signal according to a predetermined velocity profile;

a piezoelectric device control circuit operatively coupled to said position and velocity control circuits and operable to receive the third control signal and generate a fourth control signal in response to the third control signal that is adapted to drive the piezoelectric device to the desired position and at the desired velocity according to the predetermined velocity profile;

wherein said position control circuit includes a first data structure operable to determine and correlate an applied voltage to the piezoelectric device with a charge existing on the piezoelectric device to generate the estimated position of the piezoelectric device; and wherein said position control circuit further includes a current integrator circuit operable to integrate current flowing through the piezoelectric device to determine the charge existing on the piezoelectric device.

3. An apparatus for determining a position of a piezoelectric device, comprising:

a voltage sensing circuit operable to determine a voltage applied to the piezoelectric device;

a current sensing circuit operable to determine a charge existing on the piezoelectric device in response to a current applied to the piezoelectric device; and a position estimating circuit coupled to the voltage sensing circuit and the current sensing circuit operable to determine a position of the piezoelectric device from the voltage applied to the piezoelectric device and the charge existing on the piezoelectric device.

4. The apparatus of claim 3 wherein the position estimating circuit comprises a data structure operable to correlate the applied voltage to the piezoelectric device with the charge existing on the piezoelectric device to generate the position of the piezoelectric device.

5. The apparatus of claim 3 wherein the current sensing circuit comprises a current integrator circuit operable to integrate current flowing through the piezoelectric device to determine the charge existing on the piezoelectric device.

6. A method of determining a position of a piezoelectric device, comprising:

determining a voltage applied to a piezoelectric device;

determining a charge existing on the piezoelectric device; and determining a position of the piezoelectric device from the voltage applied to the piezoelectric device and the charge existing on the piezoelectric device.

7. The apparatus of claim 1 wherein the piezoelectric device control circuit comprises:

a voltage sensor coupled with the piezoelectric device, the voltage sensor operable to determine a voltage applied to the piezoelectric device and to transmit the actuator voltage signal corresponding to the voltage across the actuator.

8. The method of claim 6 wherein determining the charge on the piezoelectric device comprises integrating a current applied to the piezoelectric device.

9. An apparatus for determining the position of a piezoelectric device, comprising:

a position estimating circuit coupled with the piezoelectric device and operable to receive first signal indicative of a voltage applied to the piezoelectric device and a second signal indicative of a current applied to the piezoelectric device, the position estimating circuit operable to estimate the position of the piezoelectric device as a function of the first and second signals.

10. The apparatus of claim 9, further comprising:

a voltage sensor coupled with the piezoelectric device and the position estimating circuit, the voltage sensor operable to determine the voltage applied to the piezoelectric device and to transmit the first signal to the position estimating circuit as a function thereof; and a current integrator coupled with the piezoelectric device and the position estimating circuit, the current integrator operable to determine a current flowing through the piezoelectric device and to transmit the second signal to the position estimating circuit as a function thereof.

11. The apparatus of claim 10 wherein the second signal comprises the charge applied to the piezoelectric device.

12. The apparatus of claim 10 wherein the second signal comprises the integral of the current.

* * * * *